T. B. LOCKWOOD.

Hoe.

No. 8,777. Reissued June 24, 1879.

Witnesses,

W. A. Bertram

Dr L. H. Bunday

Inventor

Thos. B. Lockwood.

by

R. D. Williams.

Attorney.

N. PETERS, PHOTO-LITHOGRAPHER, WASHINGTON, D. C.

UNITED STATES PATENT OFFICE.

THOMAS B. LOCKWOOD, OF BALTIMORE, MARYLAND.

IMPROVEMENT IN HOES.

Specification forming part of Letters Patent No. 141,365, dated July 29, 1873; Reissue No. 8,777, dated June 24, 1879; application filed April 8, 1879.

*To all whom it may concern:*

Be it known that I, THOMAS B. LOCKWOOD, of Baltimore city, State of Maryland, late of Smyrna, Kent county, State of Delaware, have invented certain new and useful Improvements in Hoes; and I hereby declare the same to be fully, clearly, and exactly described as follows, reference being had to the accompanying drawings, in which—

Figure 2:
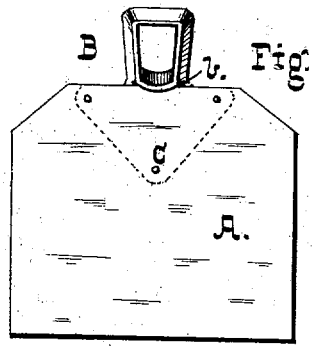
Figure 3:
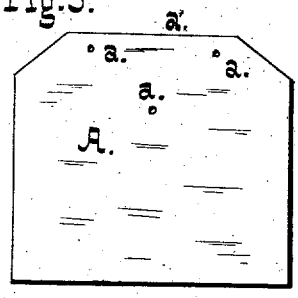
Figure 1:
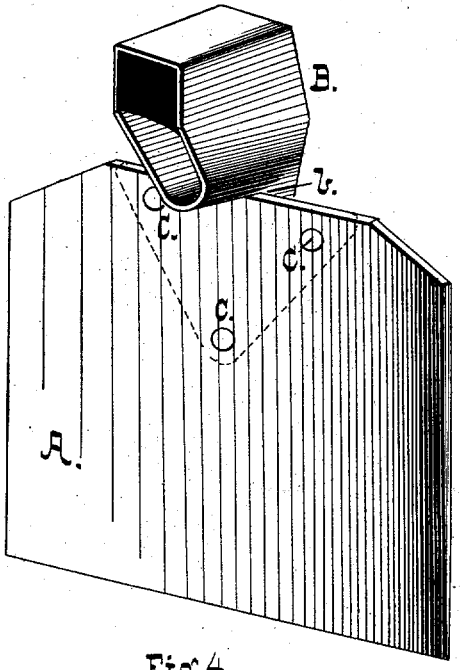
Figure 4:
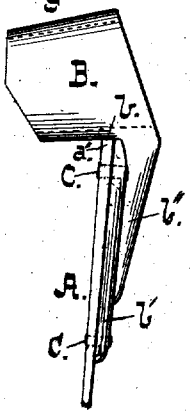

Figure 1 is a perspective view of the hoe; Fig. 2, a front elevation of the same; Fig. 3, a similar view of the blade, and Fig. 4 a side elevation of the hoe.

My invention has reference to that class of hoes having the blade riveted to the eye-plate; and it consists in a hoe of the class named, embodying certain novel features of construction designed to add to the strength and efficiency of the implement, which said features are hereinafter described and made the subject of the claim.

In the accompanying drawings, A represents the hoe-blade, preferably of steel, and provided with suitable holes *a a* for the rivets C.

B is the eye, of the usual size and shape, constructed of malleable iron, and having integral therewith the eye-plate $b'$, by preference triangular in shape, and having holes for the rivets, which register with those in the blade A. A central rib, $b''$, serves to strengthen the eye-plate $b'$.

The blade A is riveted to the eye-plate in such manner that the top $a'$ of the blade rests against the flat shoulder $b$ of the eye, the eye-plate being upon the rear side of the blade.

The described construction secures important results. The blade being in contact with the flat shoulder on the under side of the eye, the latter receives the whole force of the blow as the hoe is struck into the ground, thus relieving the rivets of all transverse strain, and preventing the blade from becoming loose on the eye-plate. The latter, being behind the hoe-plate, also prevents undue longitudinal strain upon the rivets, and leaves the face of the hoe-plate plane and smooth, thereby facilitating the discharge of the earth lifted by the hoe.

What I claim as new, and desire to secure by Letters Patent, is—

1. The hoe herein described, having its blade riveted to the eye-plate, and meeting a flat shoulder on the under side of the eye, substantially as and for the purpose described.

2. In combination with the blade A, the eye B, having flat shoulder $b$, eye-plate $b'$, and central rib, $b''$, substantially as set forth.

THOS. B. LOCKWOOD.

Witnesses:

WM. M. NICKERSON,

ED. RAINE.